(12) United States Patent
Yang et al.

(10) Patent No.: US 12,199,916 B2
(45) Date of Patent: Jan. 14, 2025

(54) METHOD AND DEVICE FOR WIRELESS SIGNAL TRANSMISSION OR RECEPTION IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Changhwan Park, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/531,048

(22) Filed: Dec. 6, 2023

(65) Prior Publication Data

US 2024/0106612 A1    Mar. 28, 2024

Related U.S. Application Data

(63) Continuation of application No. 17/290,539, filed as application No. PCT/KR2019/014865 on Nov. 4, 2019, now Pat. No. 11,888,779.

(Continued)

(30) Foreign Application Priority Data

| Nov. 2, 2018 | (KR) | 10-2018-0133769 |
| Jan. 11, 2019 | (KR) | 10-2019-0004184 |
| Jul. 31, 2019 | (KR) | 10-2019-0093455 |

(51) Int. Cl.
*H04L 5/00* (2006.01)
*H04W 72/23* (2023.01)

(Continued)

(52) U.S. Cl.
CPC ....... *H04L 5/0053* (2013.01); *H04W 74/0808* (2013.01)

(58) Field of Classification Search
None
See application file for complete search history.

(56) References Cited

U.S. PATENT DOCUMENTS

| 2018/0192383 A1 | 7/2018 | Nam et al. |
| 2018/0227102 A1 | 8/2018 | Wilson et al. |

(Continued)

FOREIGN PATENT DOCUMENTS

| CN | 103430469 | 12/2013 |
| CN | 108282303 | 7/2018 |
| CN | 108633073 | 10/2018 |

OTHER PUBLICATIONS

Ericsson, "Frame structure for NR-U," 3GPP TSG-RAN WG1 Meeting #94bis, R1-1811298, Chengdu, China, Oct. 8-12, 2018, 10 pages.

(Continued)

*Primary Examiner* — Duc T Duong
(74) *Attorney, Agent, or Firm* — Fish & Richardson P.C.

(57) ABSTRACT

The present invention relates to a wireless communication system and, particularly, to a method and a device therefor, the method comprising the steps of: monitoring a PDCCH candidate in an SS in units of sub-bands in a BWP including a plurality of sub-bands; and on the basis of the monitoring, detecting a PDCCH, wherein, in the BWP, the same CORESET is repeated per sub-band in a frequency domain, and a plurality of CORESETs included in the plurality of sub-bands are associated with the same SS.

15 Claims, 14 Drawing Sheets

Related U.S. Application Data

(60) Provisional application No. 62/910,319, filed on Oct. 3, 2019.

(51) Int. Cl.
*H04W 74/08* (2024.01)
*H04W 74/0808* (2024.01)

(56) References Cited

U.S. PATENT DOCUMENTS

| | | | |
|---|---|---|---|
| 2019/0150124 A1* | 5/2019 | Nogami | H04L 5/0044 370/330 |
| 2019/0222357 A1* | 7/2019 | Huang | H04L 5/0094 |
| 2019/0342907 A1* | 11/2019 | Huang | H04W 72/23 |
| 2020/0036497 A1* | 1/2020 | Xu | H04W 72/23 |
| 2020/0092799 A1* | 3/2020 | Xu | H04L 5/0053 |
| 2020/0351896 A1* | 11/2020 | Taherzadeh Boroujeni | H04L 5/001 |
| 2021/0119742 A1* | 4/2021 | Wu | H04L 5/0023 |
| 2021/0143953 A1* | 5/2021 | Parkvall | H04W 72/1273 |
| 2021/0297221 A1* | 9/2021 | Lee | H04L 5/0053 |
| 2021/0352501 A1* | 11/2021 | Taherzadeh Boroujeni | H04W 72/0446 |
| 2022/0132341 A1* | 4/2022 | Lee | H04W 72/1263 |

OTHER PUBLICATIONS

Huawei, HiSilicon, "DL channels and signals in NR unlicensed band," 3GPP TSG RAN WG1 Meeting #94bis, R1-1810124, Chengdu, China, Oct. 8-12, 2018, 7 pages.

Invention patent certificate in Chinese Appln. No. 201980072529.5, mailed on Jan. 9, 2024, 45 pages (with English cover page).

* cited by examiner

Non - interleaved CCE - to - REG mapping (a) Carrier aggregation between L-band and U-band (b) standalone U-band(s)

METHOD AND DEVICE FOR WIRELESS SIGNAL TRANSMISSION OR RECEPTION IN WIRELESS COMMUNICATION SYSTEM

CROSS-REFERENCE TO RELATED APPLICATIONS

This application is a continuation of U.S. application Ser. No. 17/290,539, filed on Apr. 30, 2021, which is a National Stage application under 35 U.S.C. § 371 of International Application No. PCT/KR2019/014865, filed on Nov. 4, 2019, which claims the benefit of U.S. Provisional Application No. 62/910,319, filed on Oct. 3, 2019, Korean Application No. 10-2019-0093455, filed on Jul. 31, 2019, Korean Application No. 10-2019-0004184, filed on Jan. 11, 2019, and Korean Application No. 10-2018-0133769, filed on Nov. 2, 2018. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to one aspect of the present disclosure, a method of receiving control information in a wireless communication system is provided. The method includes monitoring physical downlink control channel (PDCCH) candidates in a search space (SS) on a subband basis in a bandwidth part (BWP) including a plurality of subbands, and detecting a PDCCH based on the monitoring. The same control resource set (CORESET) is repeated in each of the plurality of subbands in a frequency domain in the BWP, and the plurality of CORESETs configured in the plurality of subbands are associated with a same SS.

According to another aspect of the present disclosure, an apparatus used in a wireless communication system is provided. The apparatus includes a memory and a processor. The processor is configured to monitor a PDCCH candidate in an SS on a subband basis in a BWP including a plurality of subbands, and detect a PDCCH based on the monitoring. The same CORESET is repeated in each of the plurality of subbands in a frequency domain in the BWP, and the plurality of CORESETs configured in the plurality of subbands are associated with a same SS.

The BWP may operate in an unlicensed cell (UCell).

The subbands may be frequency bands for which listen-before-talk (LBT) is performed.

Information about one or more subbands among the plurality of subbands may be received, and the PDCCH candidate may be monitored in at least one of the one or more subbands.

The CORESETs repeated in the plurality of subbands may are different only in frequency positions, and other CORESET configuration parameters are same. The other parameters may include at least one of information about a time resource region or a transmission configuration index (TCI).

The association between the plurality of CORESETs and the same SS may include that the same SS being configured in each of the plurality of CORESETs.

The apparatus may be communicable with at least a user equipment (UE), a network, and an autonomous driving vehicle other than the apparatus.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
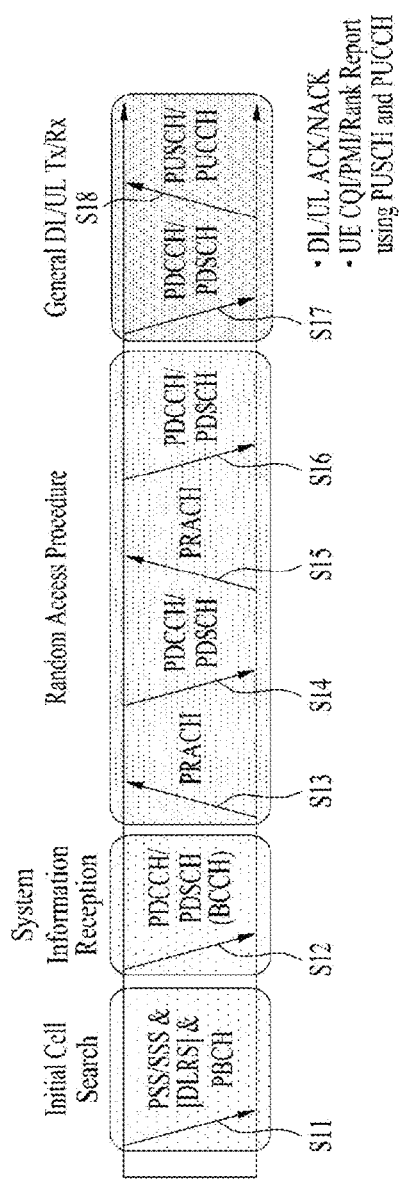
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
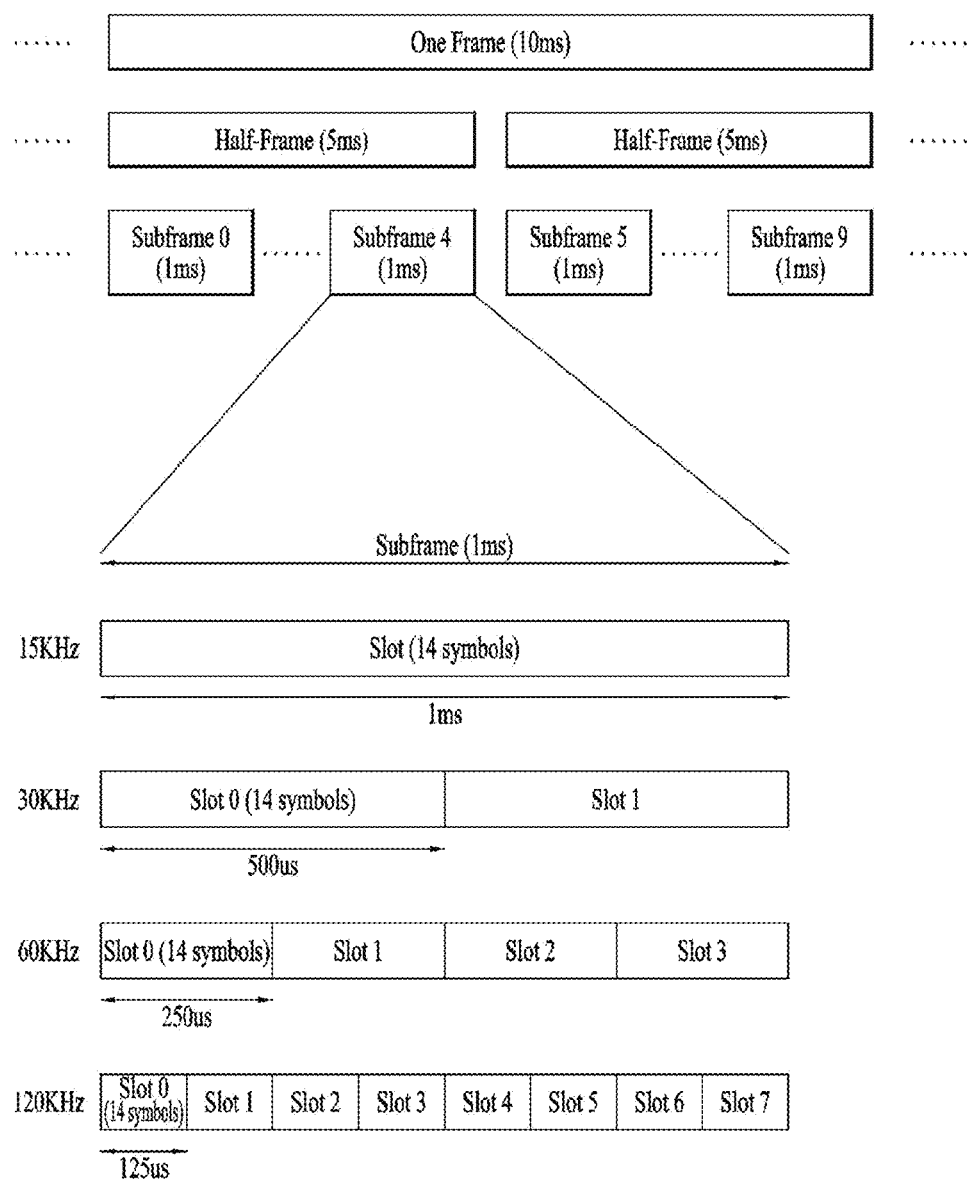
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: Number of symbols in a slot
*Nframe, uslot: Number of slots in a frame
*Nsubframe, uslot: Number of slots in a subframe Table 2 illustrates that the number of symbols per slot, the number of slots per frame, and the number of slots per subframe vary according to the SCS when the extended CP is used.

TABLE 2

| SCS (15*2^u) | Nslotsymb | Nframe, uslot | Nsubframe, uslot |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
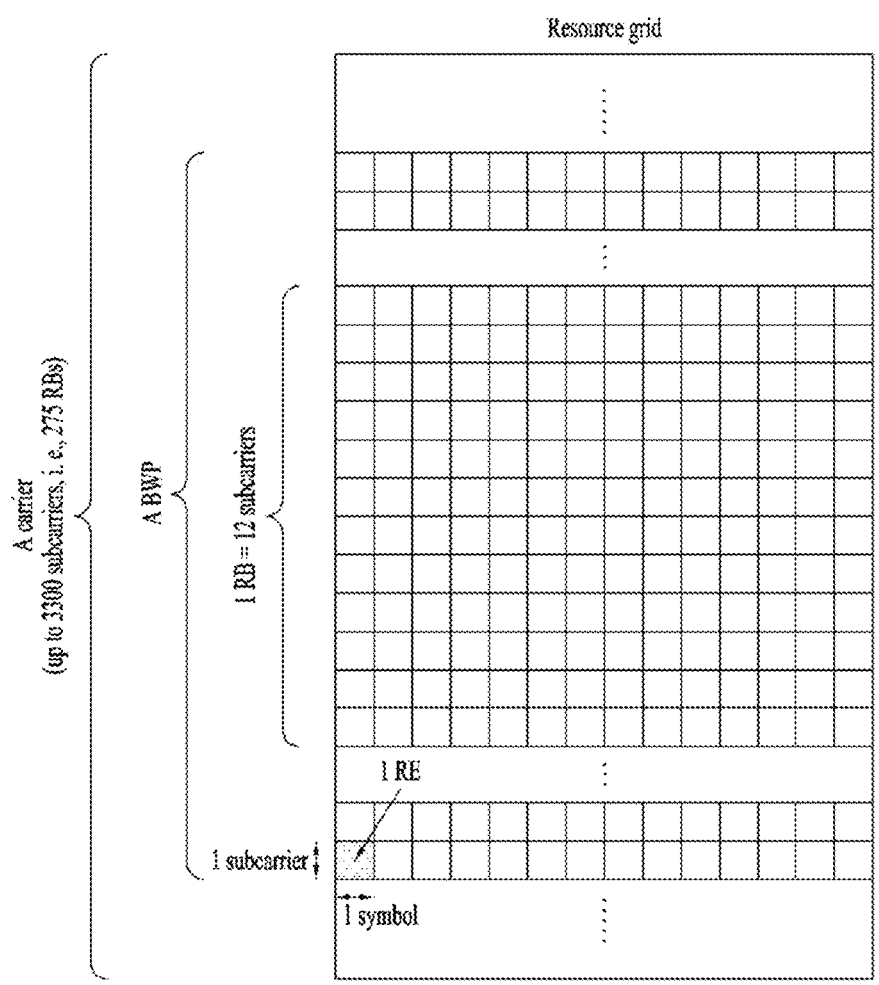
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
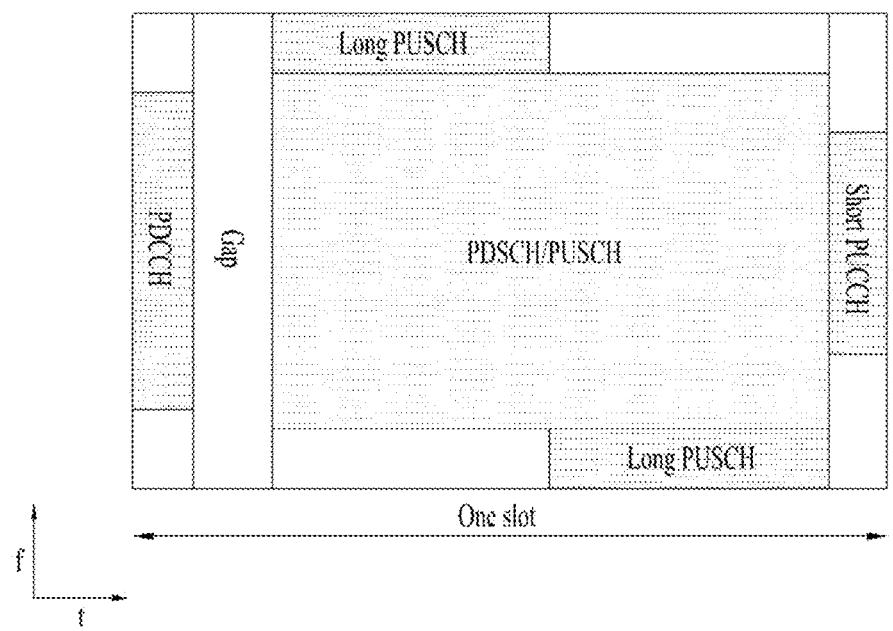
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
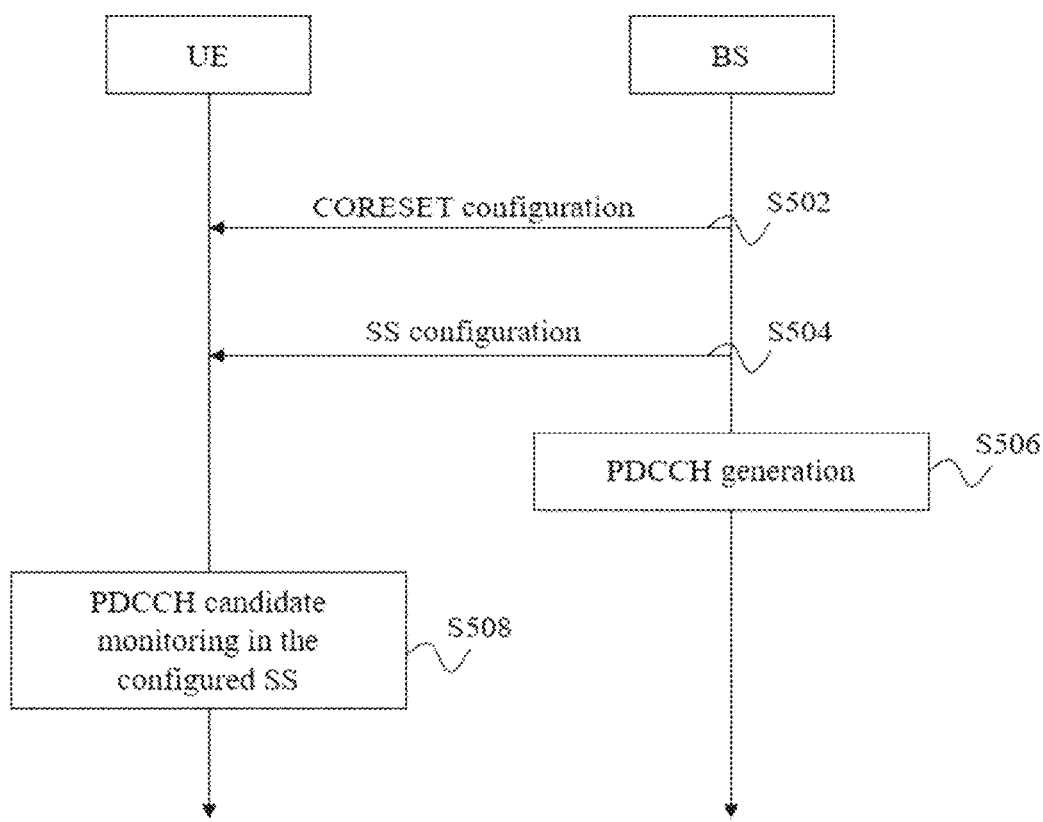
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORESET is defined as a set of resource element groups (REGs) having a given numerology (e.g., an SCS, a CP length, and so on). An REG is defined as one OFDM symbol by one (P)RB. A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). The UE-specific RRC signaling may include, for example, an RRC setup message, BWP configuration information, and so on.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 4-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
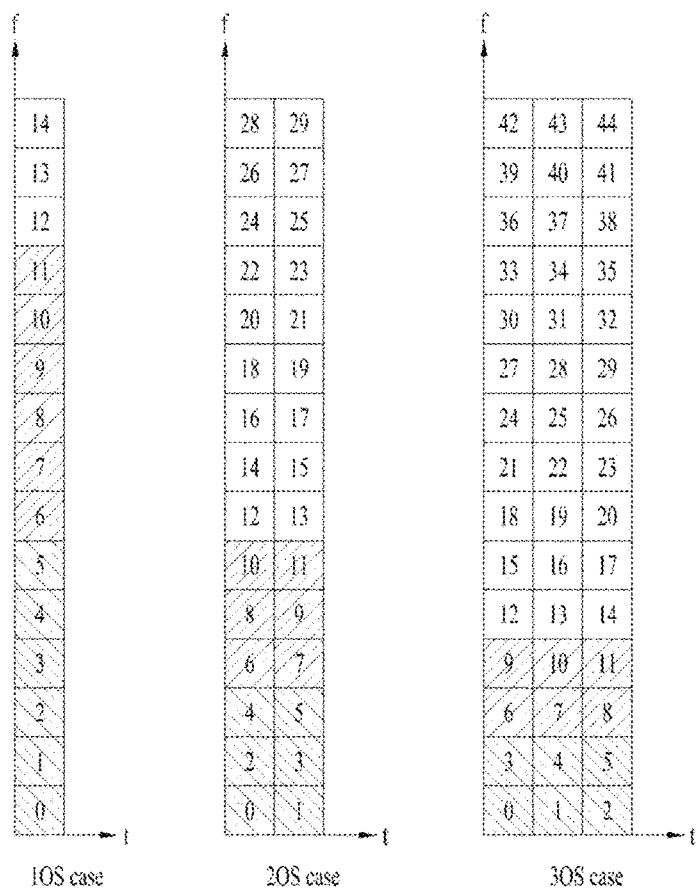
FIGS. 6 and 7 illustrate exemplary control resource set (CORESET) structures.
Figure 7:
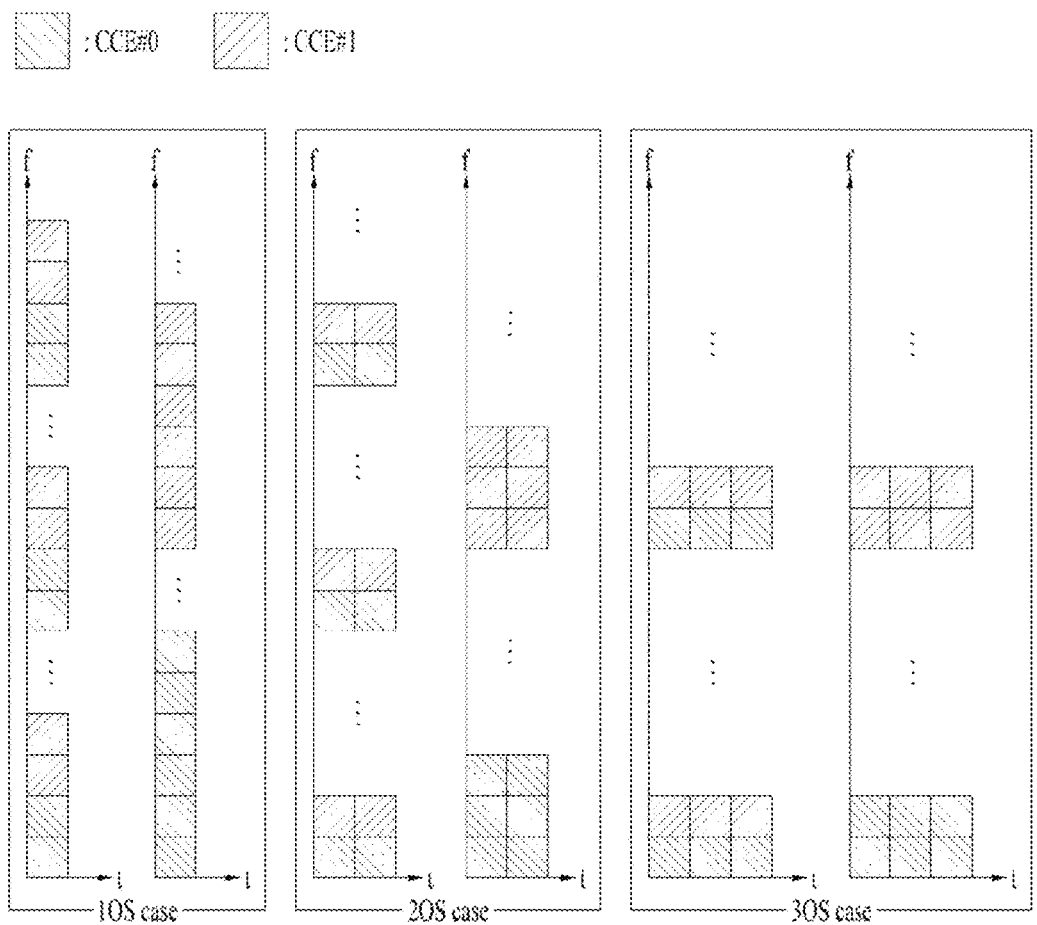

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

The 3GPP standardization organization has been working on standardization of a 5th generation (5G) wireless communication system called NR. The 3GPP NR system is designed to support a plurality of logical networks in a single physical system, and support services (e.g., eMBB, mMTC, URLLC, and so on) having various requirements by changing an OFDM numerology (e.g., an OFDM symbol duration, and an SCS). As data traffic rapidly increases along with the recent emergence of smart devices, a technique of using an unlicensed band in cellular communication is also considered for the 3GPP NR system, like licensed-assisted access (LAA) in the legacy 3GPP LTE system. Compared to LAA, however, an NR cell in an unlicensed band (hereinafter, referred to as NR UCell) is aimed at a stand-alone (SA) operation. For example, PUCCH transmission, PUSCH transmission, and so on may be supported in the NR UCell.

Figure 8:
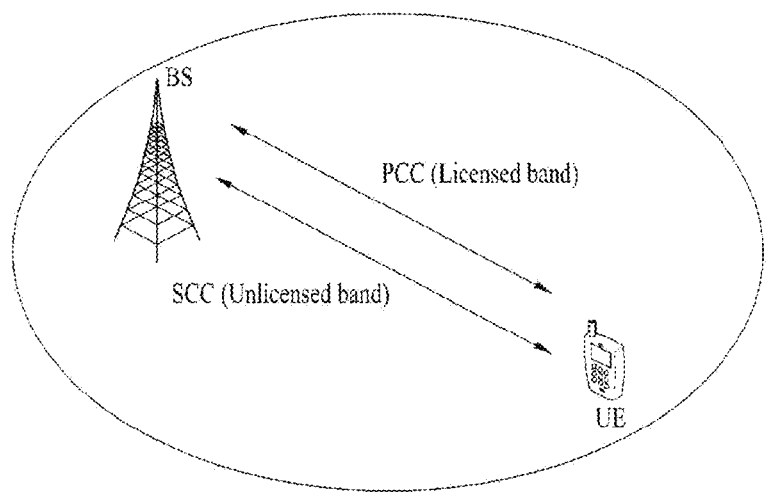
FIG. 8 illustrates exemplary wireless communication systems supporting an unlicensed band.
Figure 8:
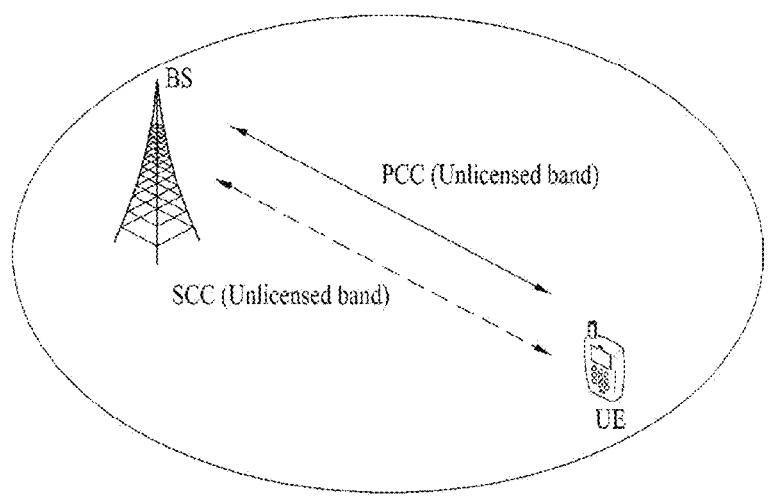

FIG. 8 illustrates a wireless communication system supporting an unlicensed band. For convenience, a cell operating in a licensed band (hereinafter, L-band) is defined as an LCell and a carrier of the LCell is defined as a (DL/UL) LCC. A cell operating in an unlicensed band (hereinafter, U-band) is defined as a UCell and a carrier of the UCell is defined as a (DL/UL) UCC. A carrier of a cell may represent an operating frequency (e.g., a center frequency) of the cell. A cell/carrier (e.g., CC) may generically be referred to as a cell.

When carrier aggregation is supported, one UE may transmit and receive signals to and from a BS in a plurality of aggregated cells/carriers. If a plurality of CCs is configured for one UE, one CC may be configured as a primary CC (PCC) and the other CCs may be configured as secondary CCs (SCCs). Specific control information/channels (e.g., a CSS PDCCH and PUCCH) may be configured to transmit and receive signals only in the PCC. Data may be transmitted and received in the PCC and/or the SCCs. In FIG. 8(*a*), the UE and the BS transmit and receive signals in the LCC and the UCC (non-standalone (NSA) mode). In this case, the LCC may be configured as the PCC and the UCC may be configured as the SCC. If a plurality of LCCs is configured for the UE, one specific LCC may be configured as the PCC and the other LCCs may be configured as the SCCs. FIG. 8(*a*) corresponds to LAA of the 3GPP LTE system. FIG. 8(*b*) illustrates the case in which the UE and the BS transmit and receive signals in one or more UCCs without the LCC (SA mode). In this case, one of the UCCs may be configured as the PCC and the other UCCs may be configured as the SCCs. Both the NSA mode and the SA mode may be supported in an unlicensed band of the 3GPP NR system.

Figure 9:
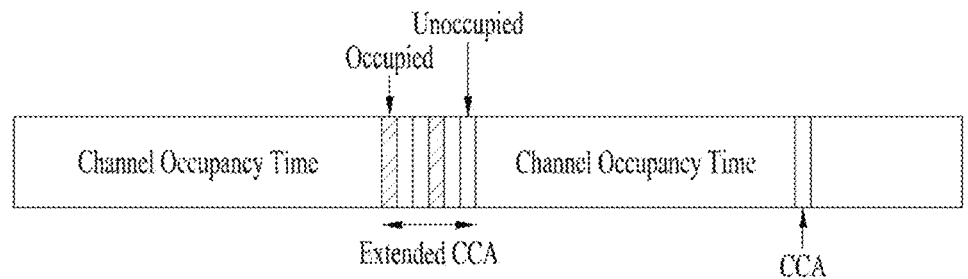
FIG. 9 illustrates an exemplary method of occupying resources in an unlicensed band.

FIG. 9 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the UCell. The above processes may be referred to as listen-before-talk (LBT) or a channel access procedure (CAP). LBT and CAP may be used interchangeably.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Embodiments: Transmission/Reception of Control Channel in NR-U

Figure 10:
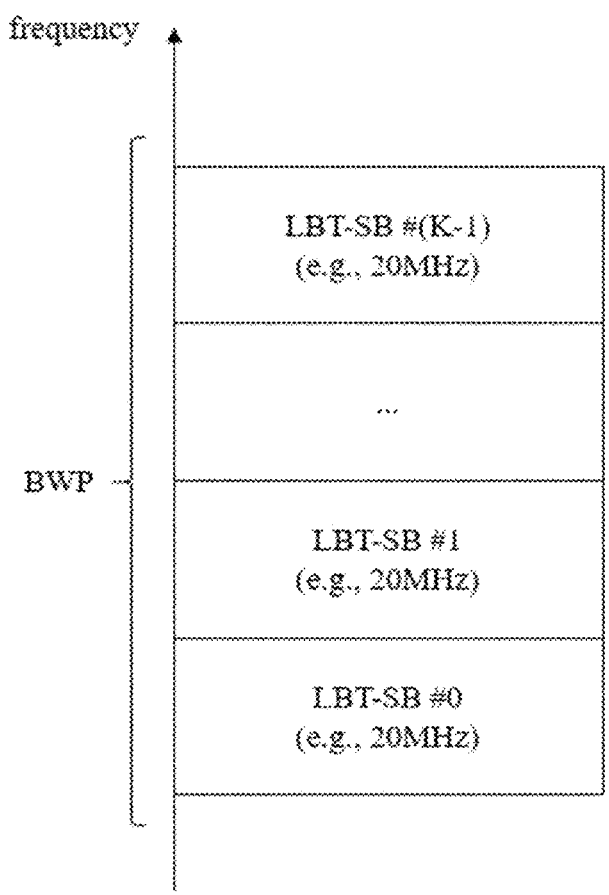
FIG. 10 illustrates an exemplary bandwidth part (BWP) structure.

Compared to legacy LTE (LAA), one CC/cell or BWP may be configured as a wideband (WB) CC/BWP for a UE in an NR U-band situation. However, a BW requiring CCA based on an independent LBT operation may be limited even in the WB CC/BWP (according to a specific regulation). In this context, when an individual unit subband for which LBT is performed is defined as an LBT-subband (LBT-SB), one WB CC/BWP may include a plurality of LBT-SBs. FIG. 10 illustrates a case in which a BWP includes a plurality of LBT-SBs. An LBT-SB may have, for example, a band of 20 MHz.

In the above situation, when a BS passes LBT (the resulting CCA) for a DL transmission, only in a part of a plurality of LBT-SBs within a WB-CC/BWP, while failing in LBT in the other LBT-SBs, the DL transmission from the BS and reception of the DL transmission at the UE may have to be performed only in the LBT-pass-SBs.

The present disclosure proposes a PDCCH transmission/reception method, when a CC/BWP including a plurality of LBT-SBs (hereinafter, referred to as a WB-BWP) is configured. Specifically, the present disclosure proposes a method of configuring a PDCCH SS (e.g., a PDCCH candidate set) in consideration of a WB-BWP operation based on LBT performed on an LBT-SB basis, and a method of performing PDCCH monitoring (e.g., PDCCH BD) based on the PDCCH SS configuration method by a UE. Before a description of the proposed methods, assumptions/terms related to the inclusion relationship between a WB-BWP and LBT-SBs and the PDCCH BD capability of a UE are summarized as follows. In the present disclosure, "X/Y" may be replaced with a ceiling function, ceil(X/Y) or as a flooring function, floor(X/Y).

K: the number of LBT-SBs included in one BWP (e.g., WB-BWP).

N_max: the maximum number of PDCCH BDs that the UE is capable of performing in a single slot on a single CC/BWP.

CORESET: a time/frequency resource region (having a specific time duration) in which one or more PDCCH SSs may be configured/transmitted/detected.

CORESET configuration: includes parameters required for configuring/defining a CORESET. For the CORESET configuration, the description of FIG. 5 may be referred to. For more detail, refer to 3GPP TS 38.331 Rel-15, "ControlResourceSet information element". Each CORESET configuration is identified by a CORESET ID.

SS configuration: includes parameters required for configuring/defining an SS. For the SS configuration, refer to the description of FIG. 5. For more details, see 3GPP TS 38.331 Rel-15, "SearchSpace information element". Each SS configuration is identified by an SS ID.

LBT-BW: a unit BW (e.g., 20 MHz) (or an equivalent number of RBs/an equivalent RB set) requiring individual/independent LBT or a BW (or an equivalent number of RBs/an equivalent RB set) except a guard band in the unit BW. LBT-BW may be interchangeably used with subband (SB), narrowband (NB), LBT-SB, and LBT-NB in the same meaning.

LBT-pass-SB: an LBT-SB for which CCA is successful through LBT or an LBT-SB available for a signal transmission and reception operation.

LBT-fail-SB: an LBT-SB for which CCA is failed through LBT or an LBT-SB unavailable for a signal transmission and reception operation.

Allocation/execution of BD for specific X PDCCH candidates (or allocation/execution of specific X BDs (BD candidates): this may mean that the X PDCCH candidates are a maximum number of available/valid BD targets. The number of PDCCH candidates for which the UE actually performs a BD operation may be set to a value equal to or less than X through comparison with the maximum number of PDCCH BDs that the UE is capable of performing in a single slot on a single CC/BWP.

CC or BWP (an RB set/RB indexes in the BW): a (virtual) BW (an RB set/RB indexes in the BW) configured/defined with respect to a reference point A which is a specific frequency position configured separately.

The proposed methods of the present disclosure may also be applied to a channel estimation (CE) process of a UE (e.g., a DMRS-based CE operation for a unit resource (e.g., CCE) used for PDCCH transmission). For example, for UE capable (maximum) CE processing during a single slot on a single CC/BWP, a similar principle/operation of the proposed method may be applied by replacing the number of PDCCH BDs (PDCCH BD candidates) with the number of CCEs subject to CE (for PDCCH detection/reception in each LBT-SB or LBT-pass-SB).

In the following description, a PDCCH (and SS) may be limited to mean only a PDCCH carrying UE-specific DCI (and a USS for DCI configuration/transmission). Accordingly, the proposed methods may be applied, excluding a PDCCH carrying UE (group)-common DCI (and a CSS for DCI configuration/transmission) and (the number of) BDs for the PDCCH. Alternatively, a PDCCH (and SS) may mean any PDCCH (and SS) except for a specific PDCCH (hereinafter, referred to as special PDCCH) carrying information about the position/index of an LBT-pass-SB (and an SS for corresponding DCI configuration/transmission). Accordingly, the proposed methods may be applied, excluding the special PDCCH (and SS) and (the number of) BDs for the special PDCCH.

(1) Proposed Method 1

For K LBT-SBs included in one WB-BWP, a CORESET may be configured for each individual LBT-SB, or one CORESET may be configured over a plurality of LBT-SBs. A PDCCH SS may be set/configured in each LBT-SB based on the CORESET in the following manner.

1) Opt 1: (One) PDCCH SS including N PDCCH candidates may be configured for each LBT-SB. N may be set to a value equal to or less than N_max. The same or different N values may be set for a plurality of LBT-SBs.

2) Opt 2: K' PDCCH SSs each including N' PDCCH candidates may be configured for each LBT-SB. The same or different N' values may be set for a plurality of SSs, and the sum of values N' across the K' SSs may be equal to or less than N_max, where a value N' is set for each SS. For example, N'=N_max/K or N'=N_max/K'. K' may be equal to or different from K.

In this situation, the UE may perform a PDCCH BD (monitoring) operation according to the result of LBT for the WB-BWP (the K LBT-SBs included in the WB-BWP) as follows.

In a slot before the UE identifies the positions/indexes of LBT-pass-SBs for which LBT is successful in the WB-BWP by a specific signal/signaling, the UE may perform PDCCH BD (hereinafter, referred to as default BD) in the following manner.

A. In Opt 1, the UE may perform BD only for specific Na PDCCH candidates (e.g., having the lowest indexes) (Na<N, for example, Na=N/K or Na=N_max/K) among the N PDCCH candidates configured in the PDCCH SS of each LBT-SB. The sum of values Na across the LBT-SBs may be equal to or less than N or N_max, where a value Na is set/determined for each LBT-SB.

B. In Opt 2, the UE may perform BD only for one specific PDCCH SS (e.g., having the lowest index) among the K' PDCCH SSs of each LBT-SB. For example, the UE may perform BD only for the N' candidates of the PDCCH SS or Na PDCCH candidates (having the lowest indexes) (e.g., Na=N_max/K or Na=N_max/K') configured in the PDCCH SS. The sum of values Na across the LBT-SBs may be equal to or less than N_max, where a value Na is set/determined for each LBT-SB.

2) In a slot after the UE identifies the positions/indexes of the LBT-pass-SBs for which LBT is successful in the WB-BWP by the specific signal/signaling, the UE may perform PDCCH BD in the following methods.

A. Case 1: When all of the K LBT-SBs are LBT-pass-SBs,
i. the default BD operation may be performed.

B. Case 2: When only L (K>L>=1) ones of the K LBT SBs are LBT-pass-SBs, i. In Opt 1, BD may be performed for specific Nb (Nb<=N, for example, Nb=N/L or Nb=N_max/L) PDCCH candidates (e.g., having the lowest indexes) among the N PDCCH candidates configured in the PDCCH SS of each LBT-pass-SB. Nb may be set/determined in inverse proportion to L and may be set to a value equal to or larger than Na. The sum of values Nb across the LBT-pass-SBs may be equal to or less than N or N_max, where a value Nb is set/determined for each LBT-pass-SB.

ii. In Opt 2, for each LBT-pass-SB, BD may be performed for Ka specific (Ka<=K', for example, Ka=K'/L or Ka=K/L) PDCCH SSs (e.g., having the lowest indexes) among the K' PDCCH SSs of the LBT-pass-SB. For example, BD may be performed for all of the PDCCH candidates configured in each of the Ka PDCCH SSs or some (e.g., PDCCH candidate(s) having the lowest index(es)) of the PDCCH candidates.

C. In another method, when L is less than a specific value, the UE may apply the operation of Case 2, whereas when L is equal to or larger than the specific value, the UE may perform the default BD operation for each individual LBT-pass-SB.

The proposals may be generalized to the following PDCCH BD methods of the UE, when each of K LBT-SBs included in one WB-BWP is configured with N PDCCH candidates (N may be equal or different for the K LBT-SBs) and L LBT-SBs out of the K LBT-SBs are LBT-pass-SBs.

1) When K>=L>1, the UE may perform BD only for specific Np (<N) PDCCH candidates (e.g., having the lowest indexes) configured in each of the LBT-pass-SBs. As L increases, Np decreases, and as L decreases, Np increases. The UE may skip BD for LBT-fail-SBs (the PDCCH candidates configured in the LBT-fail-SBs).

2) When L=1, the UE may perform BD for the N PDCCH candidates configured in the single LBT-pass-SB. The UE may skip BD for LBT-fail-SBs (the PDCCH candidates configured in the LBT-fail-SBs).

In another method, in the case where N PDCCH candidates are configured in each of K LBT-SBs included in a single WB BWP (N is equal or different for the K LBT-SBs), when L LBT-SBs out of the K LBT-SBs are LBT-pass-SBs, the UE may perform PDCCH BD in the following methods.

When K>=L>=1, the UE may perform BD for the N PDCCH candidates configured in each of the LBT-pass-SBs. The UE may skip BD for LBT-fail-SBs (the PDCCH candidates configured in the LBT-fail-SB s).

(2) Proposed Method 2

For K LBT-SBs included in a WB-BWP, a CORESET may be configured in each individual LBT-SB or one CORESET may be configured over a plurality of LBT-SBs. A PDCCH SS may be set/configured on an LBT-SB basis based on the CORESET as follows.

1) Opt 1: (One) PDCCH SS including N PDCCH candidates may be configured for each LBT-SB. N may be set to a value equal to or less than N_max. The same or different N values may be set for a plurality of LBT-SBs.

2) Opt 2: K' PDCCH SSs each including N' PDCCH candidates may be configured for each LBT-SB. The same or different N' values may be set for a plurality of SSs, and the sum of values N' across the K' SSs may be equal to or less than N_max, where a value N' is set for each SS. For example, N'=N_max/K or N'=N_max/K'. K' may be equal to or different from K.

In this situation, the UE may perform PDCCH BD (monitoring) according to the result of LBT for (the K LBT-SBs included in) the WB-BWP in the following manner.

1) Before PDCCH BD (monitoring), the UE may operate to identify the positions/indexes of LBT-pass-SBs in the WB-BWP by a specific signal/signaling or by PDCCH DMRS detection.

A. That is, the UE may not perform PDCCH BD (monitoring) until before identifying the positions/indexes of the LBT-pass-SBs in the WB-BWP.

B. However, when the specific signal/signaling is in a specific PDCCH (hereinafter, referred to as special PDCCH) format, the special PDCCH (and an SS configured for configuration/transmission of the special PDCCH) may be excluded (exceptionally) from the operation of not performing PDCCH BD, described in 'A'.

2) After identifying the positions/indexes of the LBT-pass-SBs in the WB-BWP by the specific signal/signaling or by PDCCH DMRS detection, the UE may perform PDCCH BD in the following manner.

A. The selection priority levels of the K LBT-SBs (or the (relative) indexes of the K LBT-SBs) may be preconfigured for the UE (e.g., by RRC signaling or the like).

B. When L (K>=L>=1) ones of the K LBT-SBs are LBT-pass-SBs, only one LBT-pass-SB with the highest priority level (or with a specific (e.g., lowest) LBT-SB index) may be selected from among the L LBT-pass-SBs. The UE may perform PDCCH BD for the total N PDCCH candidates set/configured in the selected LBT-pass-SB (in Opt 1) or only for the K' SSs (each including N' PDCCH candidates) set/configured in the selected LBT-pass-SB (in Opt 2).

C. In another method, when L<K, the UE may operate as described in 'B', whereas when L=K, the UE may perform the default BD operation for each individual LBT-pass-SB.

The proposals may be generalized to the following PDCCH BD methods of the UE, when each of K LBT-SBs included in one WB-BWP is configured with N PDCCH candidates (N may be equal or different for the K LBT-SBs) and L LBT-SBs out of the K LBT-SBs are LBT-pass-SBs.

K>=L>=1, the UE may perform BD only for the N PDCCH candidates configured in one specific one of the L LBT-pass-SBs (e.g., an LBT-pass-SB having the lowest index or the highest priority level (among the preconfigured selection priority levels of the LBT-SBs)). In this case, the UE may skip BD for (the PDCCH candidates configured in) the remaining LBT-pass-SBs and LBT-fail-SBs.

(3) Proposed Method 3

The following methods may be considered to configure a CORESET in which (a set of PDCCH BD candidates corresponding to) each PDCCH SS is transmitted/configured. Unless contradicting each other, the methods may be used in combination.

1) Opt 1: one WB CORESET (index or ID) may be configured for one PDCCH SS. For example, one PDCCH SS configuration (index or ID) may be associated with one WB CORESET configuration (index or ID). Accordingly, only one monitoring occasion/location for one PDCCH SS in the frequency domain may be provided in the BWP.

Figure 11:
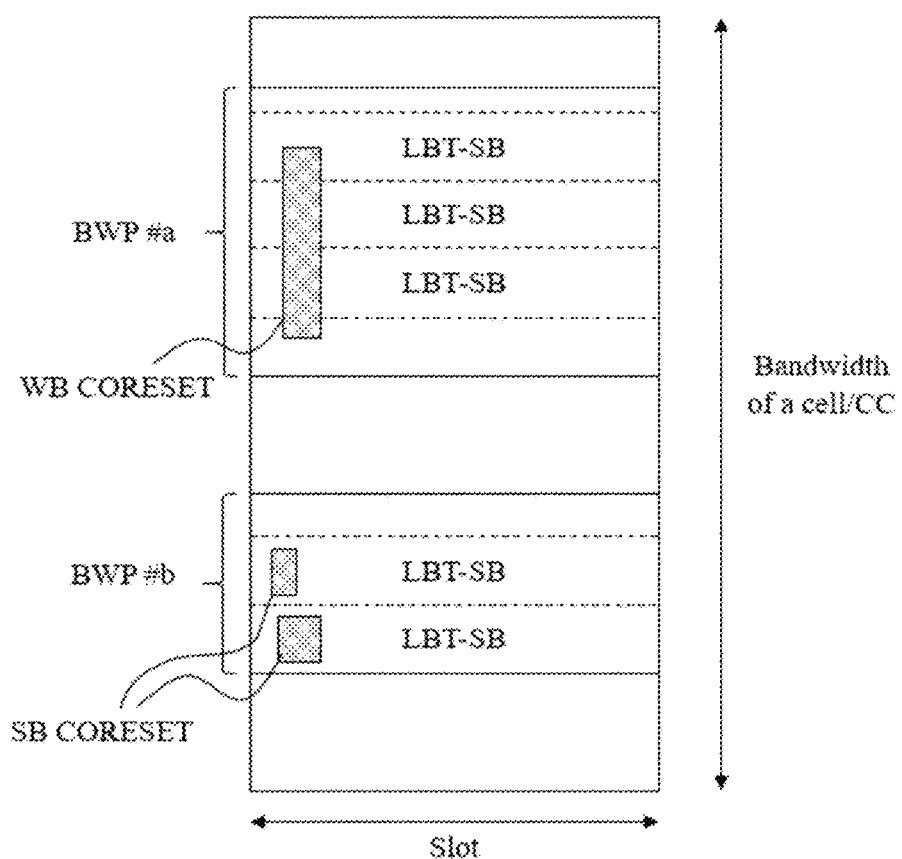
FIGS. 11 and 12 illustrate exemplary CORESET configurations according to an example of the present disclosure.

A. A WB CORESET may be configured as a frequency area including a plurality of LBT-SBs. In FIG. 11, BWP #a is an exemplary BWP in which a WB CORESET is configured.

2) Opt 2: one SB CORESET (index or ID) may be configured for one PDCCH SS. For example, one PDCCH SS configuration (index or ID) may be associated with one SB CORESET configuration (index or ID). Accordingly, only one monitoring occasion/location for one PDCCH SS in the frequency domain may be provided in an LBT-SB.

A. An SB CORESET may be configured as a frequency area confined to one LBT-SB. In FIG. 11, BWP #b is a case in which SB CORESETs are configured. In the present disclosure, SB CORESET is interchangeably used with NB CORESET.

B. A different SB CORESET may be configured for each of a plurality of PDCCH SSs.

3) Opt 3: A plurality of CORESETs (CORESET indexes or IDs) may be configured for one PDCCH SS. For example, one PDCCH SS configuration (index or ID) may be associated with a plurality of CORESET configurations (indexes or IDs). Accordingly, a monitoring occasion/location for one PDCCH SS in the frequency domain may be provided a plurality of times in the BWP.

A. The plurality of CORESETs may be configured in the form of a plurality of SB CORESETs. In this case, a monitoring occasion/location for one PDCCH SS in the frequency domain is provided a plurality of times in the BWP, and each monitoring occasion/location corresponds to the CORESET of a corresponding LBT-SB. The actual number of monitoring occasions/locations provided for one PDCCH SS in the frequency domain may be limited according to an LBT result of the BS, that is, the number of LBT-pass-SBs.

B. In a state in which a plurality of CORESETs grouped into one CORESET group, one CORESET group (index or ID) may be set for one PDCCH SS. Accordingly, a plurality of CORESETs with the same index/ID may be configured for the one PDCCH SS.

i. The same parameter, for example, the same transmission configuration index (TCI) (information about an (antenna port) QCL-related source RS and a QCL type) may be configured/applied to (PDCCHs transmitted in and/or PDSCHs scheduled by) the plurality of CORESETs belonging to the same CORESET group. For details of CORESET parameters, see the description of FIG. 5 or 3GPP TS 38.331 Rel-15, "ControlResourceSet information element". For example, when a frequency/time resource region is allocated for an (SB) CORESET configured in one LBT-SB, an (SB) CORESET having the same frequency/time resource region may be configured in each of the plurality of LBT-SBs (in the WB-BWP). The same frequency resource region may mean the same relative position and/or occupied bandwidth in each LBT-SB. When a CORESET (i.e., WB CORESET) is configured over a larger frequency area than a single LBT-SB, one CORESET (index or ID) may be configured for one PDCCH SS according to Opt 1.

Figure 12:
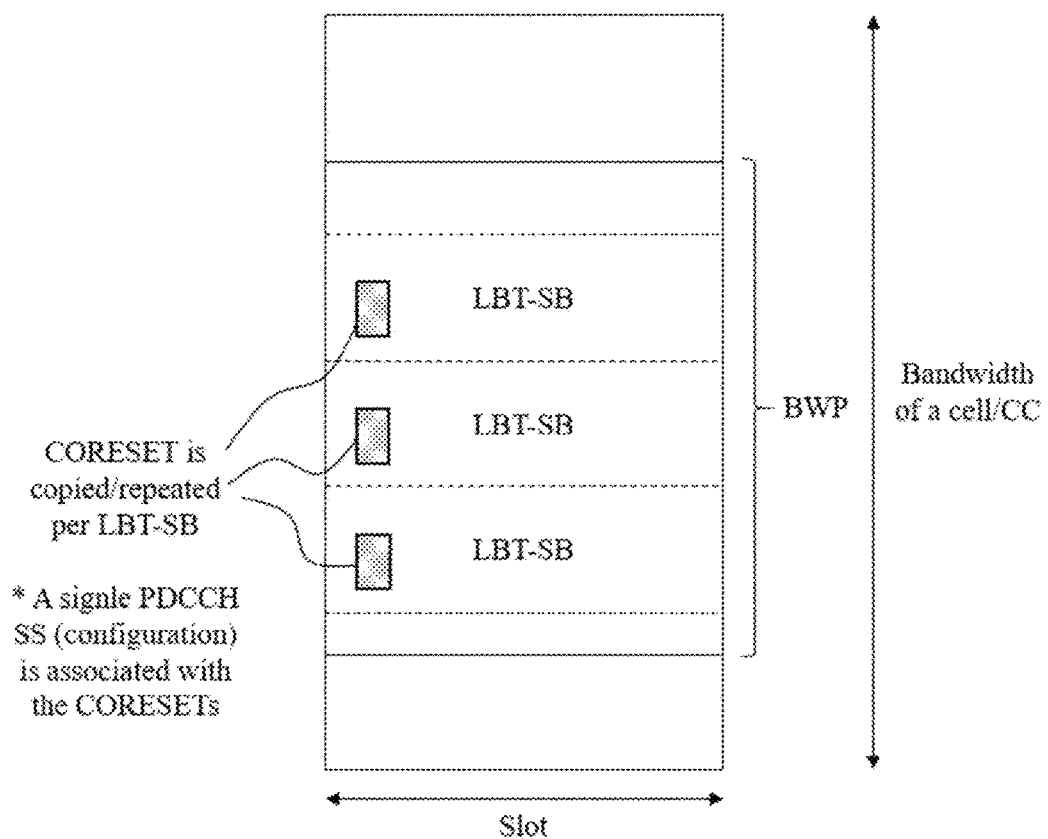

FIG. 12 illustrates an exemplary CORESET/SS configuration according to Opt 3. Referring to FIG. 12, a BWP may include a plurality of LBT-SBs each configured with an SB CORESET. The SB CORESETs configured in the LBT-SBs may be the same. Specifically, CORESET parameters for the SB CORESETs may be the same, but only a frequency domain resource parameter (i.e., frequencyDomainResources) may be different. The plurality of SB CONRESETs may be associated with the same PDCCH SS(s). That is, a plurality of monitoring occasions/locations in the frequency domain are provided for one PDCCH SS, and each monitoring occasion/location corresponds to an LBT-SB. Configuration of the same SB CORESET in each LBT SB may be based on a CORESET (i.e., SB CORESET) being configured in/confined to a single LBT-SB. For example, based on a CORESET (i.e., SB CORESET) being configured in/confined to a single LBT-SB, the same CORESET may be copied/repeated in each LBT-SB. On the contrary, when a CORESET is not confined to a single LBT-SB (i.e., in the case of a WB CORESET), only one CORESET (index or ID) may be configured for one PDCCH SS according to Opt 1 (see BWP #a in FIG. 11).

Figure 13:
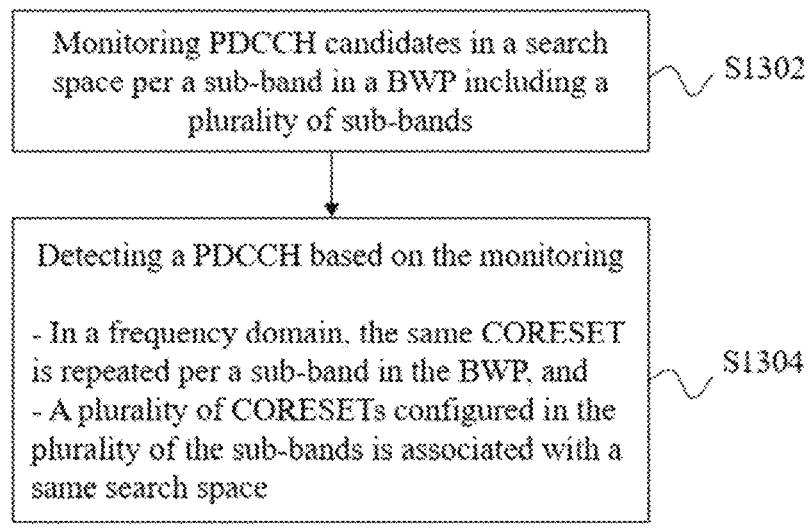
FIG. 13 is a flowchart illustrating control signal reception according to an example of the present disclosure.

FIG. 13 illustrates a control signal reception process according to an example of the present disclosure. Referring to FIG. 13, a UE may monitor PDCCH candidate(s) in an SS on a subband basis in a BWP including a plurality of subbands (S1302). The UE may then detect a PDCCH based on the monitoring (S1304). In the BWP, the same CORESET may be repeated in each subband in the frequency domain, and a plurality of CORESETs configured in the plurality of subbands may be associated with the same SS. Further, the BWP may operate in a UCell. Each subband includes a frequency band for which LBT is performed, for example, an LBT-SB. Further, the UE may receive information about one or more subbands among the plurality of subbands, and monitor PDCCH candidate(s) in at least one of the one or more subbands based on the information. Further, the CORESETs repeated in the plurality of subbands may differ from each other only in terms of frequency positions in the frequency domain, and other CORESET configuration parameters may be the same. The other CORESET configuration parameters may include at least one of information about a time resource region or a TCI. Further, the association between the plurality of CORESET and the same SS may include that the same SS being configured in each of the plurality of CORESETs.

4) Note 1: Different Opts (e.g., Opt 1/3 and Opt 2) may be applied to different SS types.

A. For example, one WB CORESET may be configured for a CSS, whereas one SB CORESET may be configured for a USS.

B. In another example, a plurality of SB CORESETs may be configured for a CSS, whereas one SB CORESET may be configured for a USS.

5) Note 2: Different Opts (e.g., Opt 1/3 and Opt 2) may be applied to different DCI formats.

A. For example, a single WB CORESET or a plurality of SB CORESETs may be configured for DCI format X, and a single SB CORESET may be configured for the other DCI format Y (in a single SS (configuration)).

B. For example, DCI format X may be a DCI format used for signaling information about the position/index of an LBT-pass-SB in a WB-BWP.

Regarding a CORESET configuration, a rule indicating/identifying whether a configured CORESET is an SB CORESET belonging to/included only in a single LBT-SB (or confined to the corresponding LBT-BW (e.g., 20 MHz)) may be required. For this purpose, the following methods may be considered.

1) Method C-1: When an RBG-wise bitmap (hereinafter, referred to as a WB-bitmap) is configured based on RB sets (the indexes of RBs in the RB sets) in a CC or BWP, and only RBs belonging to/included in a specific single LBT-SB (or LBT-BW) are indicated as valid (as CORESET resources) by the WB-bitmap, the configured CORESET may correspond to an SB CORESET. An RBG may include 6 consecutive RBs.

A. For example, when a BW ranging from a (first) RB index corresponding to a first RBG (i.e., an RBG having the lowest frequency) indicated as valid (e.g., bit '1') to a (last) RB index corresponding to a last RBG (i.e., an RBG having the highest frequency) indicated as valid (e.g., bit '1') in the WB-bitmap is equal to or smaller than a single LBT-SB (or LBT-BW), the configured CORESET may correspond to an SB CORESET.

2) Method C-2: RBs valid as CORESET resources may be indicated by an RBG-wise bitmap (hereinafter, referred to as an SB-bitmap) configured only based on an RB set (the indexes of RBs in the RB set) of a single LBT-SB (LBT-BW).

A. Information about the position/index of an LBT-SB (or LBT-BW) which an SB-bitmap (CORESET resources based on the SB-bitmap) is applied to/configured for may be indicated by the (same) CORESET configuration or a (separate) PDCCH SS configuration.

B. Alternatively, it may be pre-regulated that the position/index of an LBT-SB (or LBT-BW) which an SB-bitmap (CORESET resources based on the SB-bitmap) is applied to/configured for is the lowest frequency or index in the CC or BWP.

C. For example, an SB CORESET configured in a single LBT-SB (or LBT-BW) may be signaled/configured by an SB-bitmap in a CORESET configuration. Additionally, a WB CORESET configured over a plurality of LBT-SBs (or LBT-BWs) may be signaled/configured by a WB-bitmap in a CORESET configuration.

In relation to Opt 3, a method of extending configuration of a single SB CORESET over a plurality of LBT-SBs (or LBT-BWs) through a PDCCH SS configuration (or CORESET configuration) may be required. For example, a single SB CORESET may be repeatedly configured K times in the same manner in a plurality of K LBT-SBs (or LBT-BWs). For this purpose, the following methods may be considered.

1) Method S-1: A reference SB CORESET may be configured by a CORESET configuration, and then one or more actual CORESETs may be configured according to a combination of one or more LBT-SBs (or LBT-BWs) over which the reference SB CORESET is configured (extended/repeated).

A. For example, CORESET ID/index #M may be assigned to one reference SB CORESET. Then, an actual CORESET may be configured in such a manner that CORESET #M-0 is configured by configuring the reference SB CORESET only in LBT-SB #1, CORESET #M-1 is configured by configuring the reference SB CORESET in LBT-SB #2, and CORESET #M-2 is configured by extending/repeating the reference SB CORESET over LBT-SB #1 and LBT-SB #2. In this case, an SS may be set/configured based on a specific (single) CORESET, CORESET #M-x by information included in a PDCCH SS configuration.

i. When an actual CORESET is configured by extending/repeating a single (reference) SB CORESET over a plurality of LBT-SBs (or LBT-BWs), the relative position of an SB CORESET may be set equally in each of the LBT-SBs. For example, the same difference/offset between the position of the starting RB of an LBT-SB and the position of the starting RB of an SB CORESET may be set for the plurality of LBT-SBs (or LBT-BWs).

ii. Alternatively, the relative position of an SB CORESET may be set individually/independently in each LBT-SB. For example, the difference/offset between the position of the starting RB of an LBT-SB and the position of the starting RB of an SB CORESET may be set individually/independently for each LBT-SB (or LBT-BW).

B. In another example, when the BW of a CC (or BWP) is given (with a reference SB CORESET already configured), a plurality of actual CORESETs may be configured according to the number/indexes of LBT-SBs (or LBT-BWs) belonging to/included in the CC (or BWP). For example, for K LBT-SBs, K CORESETs generated by configuring an SB CORESET in each LBT-SB, K/2 CORESETs generated by configuring (extending/repeating) an SB CORESET over two LBT-SBs, . . . , one CORESET generated by configuring (extending/repeating) an SB CORESET over all of the K LBT-SBs are available.

C. Additionally, when an SS is set/configured based on an actual CORESET including a plurality of (reference) SB CORESETs (extended/repeated over a plurality of LBT-SBs (or LBT-BWs)) by a PDCCH SS configuration, an SB CORESET monitoring periodicity/time (e.g., occasion) may be set to be equal for the plurality of SB CORESETs (or LBT-SBs) or may be set individually/independently for each SB CORESET (or LBT-SB).

2) Method S-2: Through a PDCCH SS configuration, a (preconfigured) specific single SB CORESET may be referenced, the corresponding SB CORESET is (extended/repeated) configured over one or a combination of LBT-SBs (or LBT-BWs), and an SS may be configured over the configured one or more SB CORESETs.

A. For example, the positions/indexes of LBT-SBs (or LBT-BWs) in which one or more SB CORESETs (in which the SS may be configured) are configured may be indicated by an LBT-SB-wise (or LBT-BW-wise) bitmap in the PDCCH SS configuration. For example, each bit of the bitmap corresponds to an LBT-SB, and the MSB of the bitmap corresponds to the first LBT-SB in the BWP. An SB CORESET may be configured in an LBT-SB corresponding to a bit set to 1.

i. When a single SB CORESET is extended/repeated over a plurality of LBT-SBs (or LBT-BWs), the relative position of the SB CORESET may be same in each of the LBT-SBs (or LBT-BWs). For example, the difference/offset between the position of the starting RB of an LBT-SB and the position of the starting RB of an SB CORESET may be set to be equal for the plurality of LBT-SBs (or LBT-BWs).

ii. Alternatively, the relative position of an SB CORESET may be set individually/independently for each LBT-SB (or LBT-BW). For example, the difference/offset between the position of the starting RB of an LBT-SB and the position of the starting RB of an SB CORESET may be set individually/independently for each LBT-SB (or LBT-BW).

B. In another example, the positions of one or more reference (e.g., starting) RBs over which a single SB CORESET area is configured (extended/repeated) or the offset in RBs/RBGs between the positions of the starting RBs of the plurality of SB CORESETs may be indicated by the PDCCH SS configuration.

C. In another example, whether a specific single SB CORESET is configured only in a single LBT-SB (or LBT-BW) (e.g., preconfigured by the CORESET configuration) or configured (extended/repeated) over all of a plurality of LBT-SBs (or LBT-BWs) belonging to the CC or the BWP may be indicated by the PDCCH SS configuration (e.g., by 1-bit signaling).

D. Additionally, when extension/repetition of a single SB CORESET over a plurality of LBT-SBs (or LBT-BWs) is indicated by a PDCCH SS configuration, an SB CORESET monitoring periodicity/time (e.g., occasion) may be set to be equal for the plurality of LBT-SBs or may be set individually/independently for each LBT-SB.

Method S-1 and/or Method S-2 may be applied restrictively to a specific CORESET ID/index (e.g., 0) used for configuring/transmitting a PDCCH that schedules a specific broadcast data transmission including an SIB.

Additionally, with a specific CSI-RS (resource) configured in the form of an SB CSI-RS belonging only to/included only in a single LBT-SB (or confined to the corresponding LBT-BW), the single SB CSI-RS may be extended over a plurality of LBT-SBs (or LBT-BWs). For example, the single SB CSI-RS may be repeatedly configured K times over a plurality of K LBT-SBs (or LBT-BWs). In this case, the proposed methods may be applied in a similar manner.

A rule indicating/identifying whether a (specific) CSI-RS resource is an SB CSI-RS belong only to/included only in a (specific) single LBT-SB (or LBT-BW) may be required. For this purpose, the following methods may be considered.

1) Method R-1: When an RS-RB set in which a single CSI-RS resource is configured is indicated based on an RB set (the indexes of RBs in the RB set) in a whole CC or BWP, and when the RS-RB set includes only RBs belonging to/included in a specific single LBT-SB (or LBT-BW), the configured CSI-RS resource may correspond to an SB CSI-RS.

2) Method R-2: An RS-RB set in which a single CSI-RS resource is configured may be indicated based on an RB set (the indexes of RBs in the RB set) in a single LBT-SB (or LBT-BW).

A. Information about the position/index of the LBT-SB (or LBT-BW) which the RS-RB set (CSI-RS resource according to the RS-RB set) is applied to/configured in may be indicated by a CSI-RS (resource) configuration.

B. Alternatively, the position/index of the LBT-SB (or LBT-BW) which the RS-RB set (CSI-RS resource according to the RS-RB set) is applied to/configured in may be preset as the lowest frequency or index in the CC or BWP.

Then, a method of extending configuration of a single SB CSI-RS resource over a plurality of LBT-SBs (or LBT-BWs)

through a CSI-RS (resource) configuration may be required. For example, a single SB CSI-RS may be repeatedly configured K times in the same manner in a plurality of K LBT-SBs (or LBT-BWs). For this purpose, the following methods may be considered.

1) Method R-3: One reference SB CSI-RS resource may be configured or a (preconfigured) specific single SB CSI-RS (resource) may be referred to. Then, a combination of one or more LBT-SBs (or LBT-BWs) over which the (reference) SB CSI-RS resource is configured (extended/repeated) may be configured, and the configured one or more SB CSI-RSs (SB CSI-RS resources) may be set/configured as an actual single SB CSI-RS (resource).

A. For example, the positions/indexes of LBT-SBs (or LBT-BWs) in which the one or more SB CSI-RSs (SB CSI-RS resources) are configured may be indicated by an LBT-SB-wise (or LBT-BW-wise) bitmap in a CSI-RS (resource) configuration. For example, each bit of the bitmap corresponds to an LBT-SB, and the MSB of the bitmap corresponds to the first LBT-SB of the BWP. An SB CSI-RS (resource) may be configured in an LBT-SB corresponding to a bit set to 1.

i. When a single (reference) SB CSI-RS (resource) is configured (extended/repeated) over a plurality of LBT-SBs (or LBT-BWs), the relative position of the SB CSI-RS may be same in each LBT-SB (or LBT-BW). For example, the difference/offset between the position of the starting RB of an LBT-SB and the position of the starting RB of an SB CSI-RS (resource) may be set to be equal for the plurality of LBT-SBs (or LBT-BWs).

ii. Alternatively, the relative position of an SB CSI-RS may be set individually/independently in each LBT-SB (or LBT-BW). For example, the difference/offset between the position of the starting RB of an LBT-SB and the position of the starting RB of an SB CSI-RS may be set individually/independently for each LBT-SB (or LBT-BW).

B. In another example, the positions of one or more reference (e.g., starting) RBs to which a single (reference) SB CSI-RS resource region is configured (extended/repeated) or the offset in RBs/RBGs between the positions of the starting RBs of a plurality of SB CSI-RS resources may be indicated by a CSI-RS (resource) configuration.

C. In another example, whether a specific single SB CSI-RS (resource) is configured only in a (e.g., preconfigured) single LBT-SB (or LBT-BW) or (extended/repeated) over all of a plurality of LBT-SBs (or LBT-BWs) belonging to the CC or the BWP may be indicated by a CSI-RS (resource) configuration (e.g., by 1-bit signaling).

D. Additionally, when an actual CSI-RS is set/configured with a plurality of (reference) SB CSI-RSs (SB CSI-RS resources) (extended/repeated over a plurality of LBT-SBs (or LBT-BWs)) by a CSI-RS (resource) configuration, a periodicity/time (e.g., occasion) for SB CSI-RS transmission/measurement may be set to be equal for the plurality of LBT-SBs or individually/independently for each LBT-SB.

Secondly, PDCCH BDs (PDCCH BD candidates) may be allocated according to BS-LBT results for a plurality of LBT-SBs in a WB-BWP in the following methods.

1) Note 1: The following operations may be applied to an SS configured according to the afore-described Opt (e.g., Opt 1/3).

A. It is assumed hereinbelow that the number of BDs given to an SS (configuration) based on the afore-described Opt is K.

2) Opt A: A total of K BDs (BD candidates) may be allocated over all of a plurality of LBT-SBs (in a WB CORESET) or SB CORESETs configured in the SS.

A. When (all or) only a part of the plurality of LBT-SBs in the WB-BWP are indicated/detected as LBT-pass-SBs by a specific signal/signaling, the following methods may be performed.

B. Opt A-1: K BDs (BD candidates) may be allocated only to one specific LBT-pass-SB or one specific SB CORESET (e.g., having the lowest LBT-SB or CORESET index or the highest selection priority level (among the preconfigured selection priority levels of LBT-SBs or CORESETs)) among the LBT-pass-SBs (in the WB CORESET) or SB CORESETs configured in a corresponding LBT-pass-SB.

i. In this case, BD allocation/execution may be skipped for the remaining LBT-SBs or SB CORESETs (PDCCH candidates configured in the remaining LBT-SBs or SB CORESETs).

C. Opt A-2: With K BDs (BD candidates) (virtually) distributed across a plurality of LBT-SBs (in a WB CORESET) or a plurality of SB CORESETs (e.g., Kp (<K) PDCCH candidates are configured in each of the LBT-SBs or the SB CORESETs) where Kp is equal or different for the LBT-SBs or the SB CORESETs), only the Kp BDs (BD candidates) configured in an LBT-pass-SB or an SB CORESET of the corresponding LBT-SB may finally be allocated.

i. The sum of the Kp values (virtually) set for the plurality of LBT-SBs (in the WB CORESET) or the plurality of SB CORESETs may be set to K.

ii. BD allocation/execution may be skipped for the (the PDCCH candidates configured in) the remaining LBT-fail-SBs or SB CORESETs (configured in the LBT-fail-SBs).

D. Opt A-3: K BDs (BD candidates) may be distributed across all LBT-pass-SBs (in a WB CORESET) or all SB CORESETs configured in a corresponding LBT-pass-SB. For example, Kp (<K) PDCCH candidates may be allocated to each of the LBT-pass-SBs or the SB CORESETs (Kp is equal or different for the LBT-SBs or the SB CORESETs).

i. The sum of Kp values (finally) set for the LBT-SBs (in the WB CORESET) or the corresponding LBT-SB may be set to K.

ii. BD allocation/execution may be skipped for the (PDCCH candidates configured in) the remaining LBT-fail-SBs or SB CORESETs (configured in the LBT-fail-SB s).

3) Opt B: K BDs may be allocated to each of a plurality of LBT-SBs (in a WB CORESET) or each of a plurality of SB CORESETs, which are configured in an SS.

A. When (all or) only a part of the plurality of LBT-SBs in the WB-BWP are indicated/detected as LBT-pass-SBs by a specific signal/signaling, the following operations may be performed.

B. Opt B-1: The K BDs (BD candidates) configured in each of the LBT-pass-SBs (in the WB CORESET) or each of the SB CORESETs of a corresponding LBT-pass-SB may be allocated.

i. BD allocation/execution may be skipped for the (PDCCH candidates configured in) the remaining LBT-fail-SBs or SB CORESETs (configured in the LBT-fail-SB s).

Thirdly, when a maximum number of PDCCH BDs (e.g., max BD limit) that the UE may perform in a single slot on a single CC/BWP is set/determined, an actual BD candidate may be allocated in the following methods.

1) Note 1: When the number of (pre)configured/allocated BDs in a CSS and a USS is larger than the max BD limit, the following operation may be performed.

A. In the following description, LBT-SB may be replaced with LBT-pass-SB.

2) Opt X: Method of allocating BD candidate at SS level.

A. For a plurality of LBT-SBs (in a WB CORESET) or SSs configured in SB CORESETs of the plurality of LBT- SBs, BD candidates may first be allocated to an LBT-SB, CORESET, or SS having the highest priority level.

i. The plurality of LBT-SBs, the plurality of CORESETs, or the plurality of SSs may be pre-prioritized (by the BS), the LBT-SBs, CORESETs or SSs may be prioritized such that LBT-SBs, CORESETs, or SSs with lower indexes have higher priority levels, and/or priority may be given to a CSS over a USS.

ii. For an LBT-SB/LBT-pass-SB which has not been selected in the above operation (i.e., which has a low priority level) or (an SS configured in) an SB CORESET (in the SB), BD allocation/execution may be skipped.

iii. In this case, BD allocation/execution may be skipped for the remaining LBT-fail-SBs or (SSs configured in) the remaining SB CORESETs (in the LBT-fail-SBs).

B. When a WB CORESET (over a plurality of LBT-SBs) or a plurality of SB CORESETs are configured in a specific (single) CSS and/or USS, the following operations may be performed.

C. Opt X-1: Only when all of a plurality of LBT-SBs (in which the WB CORESET or SB CORESETs are configured) are LBT-pass-SBs, BD candidates may be allocated to the whole CSS/USS. Otherwise, BD allocation/execution may be skipped for the whole CSS/USS.

D. Opt X-2: BD candidates may be allocated to a corresponding CSS/USS only in an actual LBT-pass-SB among the plurality of LBT-SBs (in which the WB CORESET or SB CORESETs are configured). BD allocation/execution for a corresponding CSS/USS may be skipped for the remaining LBT-fail-SBs.

E. Note 2: For example, for a CSS (an SS or BD candidates configured for a special PDCCH (transmission)), Opt X-1 or Opt X-2 may be applied, whereas for a USS (or an SS/BD candidates except for the SS/BD candidates configured for the special PDCCH), Opt X-2 may be applied.

3) Note 3: The following operations may be applied to a (single) SS set/configured according to the above Opt (e.g., Opt 1/3).

A. In the following description, LBT-SB may be replaced with LBT-pass-SB.

4) Opt Y: Method of allocating BD candidate at LBT-SB level or SB CORESET level

A. For a plurality of LBT-SBs or a plurality of SB CORESETs (configured in the plurality of LBT-SBs) configured in an SS, a BD candidate may first be allocated to an LBT-SB or CORESET having the highest priority.

i. The plurality of LBT-SBs or the plurality of CORESETs may be pre-prioritized (by the BS), or higher priority levels may be assigned to LBT-SBs or CORESETs with lower indexes.

ii. For LBT-SBs/LBT-pass-SBs which have not been selected in the above operation (i.e., which have low priority levels) or SB CORESETs (in the SBs), BD allocation/execution may be skipped.

iii. In this case, BD allocation/execution may be skipped for the remaining LBT-fail-SBs or the remaining SB CORESETs (in the LBT-fail-SBs).

(4) Proposed Method 4

The NR system supports both of a general CP-OFDM scheme and a DFT-s-OFDM scheme that applies DFT (at the front end of IFFT) as a waveform for transmission of a UL channel (e.g., PUSCH or PUCCH) from a UE. Accordingly, one of the two types of waveforms may be configured/indicated semi-statically or dynamically for a UL channel transmission of the UE in consideration of a situation/performance such as the UL transmission coverage of the UE, peak-to-average power ratio (PAPR) characteristics of the UL transmission, and frequency efficiency of the UL transmission in the NR system.

In the NR U-band situation, one UL channel transmission over a WB-BWP including a plurality of LBT-SBs may be scheduled/indicated. In this case, the UE may have to perform LBT for each individual LBT-SB allocated for the single UL channel transmission (just before the UL channel transmission). In this case, when LBT is successful only in some of the plurality of LBT-SBs (allocated for the single UL channel transmission), the following two transmission operations may be considered.

1) Opt 1: Signal mapping/transmission is skipped (for an LBT-fail-SB) by performing puncturing (or rate-matching) (resources corresponding to) a signal to be mapped to the LBT-fail-SB, while a UL channel signal is mapped/transmitted only in the remaining LBT-pass-SBs.

2) Opt 2: The transmission of the whole UL channel signal is dropped.

Based on the above description, a method of applying a different transmission method (e.g., Opt 1 or Opt 2) according to a waveform used for a UL channel transmission may be considered. For example, when CP-OFDM is used for the UL channel transmission, Opt 1 may be applied, whereas when DFT-s-OFDM is used, Opt 2 may be applied. When Opt 1 is combined with DFT-s-OFDM, the signal processing time of the UE may be too short to perform the DFT operation again only for the remaining LBT-pass-SB part except for an LBT-fail-SB part until the UL transmission after LBT is performed.

In another method, when a UL channel transmission is scheduled/indicated as performed in DFT-s-OFDM and a plurality of LBT-SBs are allocated to the UL channel transmission, an operation of generating a DFT-s-OFDM signal by applying the DFT operation to each individual LBT-SB may be considered. Further, when a plurality of LBT-SBs are allocated to a DFT-s-OFDM-based UL channel transmission, whether to apply a separate DFT operation to each LBT-SB or a single DFT operation to all of the plurality of LBT-SBs may be configured/indicated for/to the UE, semi-statically (e.g., by RRC signaling) or dynamically (e.g., by DCI (e.g., UL grant)).

Additionally, when a UL channel transmission is scheduled/indicated as performed in CP-OFDM (or DFT-s-OFDM) and a plurality of LBT-SBs are allocated to the UL channel transmission, a CP-OFDM (or DFT-s-OFDM) signal may be generated by applying an IFFT operation to each individual LBT-SB. Further, when a plurality of LBT-SBs are allocated to a CP-OFDM-based (or DFT-s-OFDM-based) UL channel transmission, whether to apply a separate IFFT operation to each LBT-SB or a single IFFT operation to all of the plurality of LBT-SBs may be configured/indicated for/to the UE, semi-statically (e.g., by RRC signaling) or dynamically (e.g., by DCI (e.g., UL grant)). When a separate IFFT operation is configured/indicated for the UL channel transmission, Opt 1 may be applied, whereas when a single IFFT operation is configured/indicated, Opt 2 may be applied.

In another method, when a plurality of LBT-SBs are allocated for one UL channel transmission, and mapping/transmission of a DMRS to/in first some (e.g., 1 or 2) symbols of a resource region allocated for the UL channel transmission is configured/indicated, Opt 1 may be applied. On the other hand, when mapping/transmission of the DMRS to/in a symbol other than the first symbol(s) or mapping/transmission of data (or UCI) to/in the first symbol(s) is configured/indicated, Opt 2 may be applied. In another method, when a plurality of LBT-SBs are allocated for one UL channel (e.g., PUSCH) transmission, and transmission of another specific UL channel/signal (e.g., SRS) adjacent to and before the UL channel transmission in TDM is configured/indicated, Opt 1 may be applied. On the contrary, when there is no configuration/indication of any other UL transmission adjacent to and before the UL channel transmission, Opt 2 may be applied.

(In relation to the above operation), when a plurality of LBT-SBs are allocated for transmission of one UL channel, a DMRS sequence for the UL channel may be generated for/mapped to each individual LBT-SB. For example, the length of the DMRS sequence mapped to/transmitted in each LBT-SB may be determined to be a value equal to the BW of the LBT-SB or the amount of frequency resources (e.g., the number of REs) allocated to the actual UL channel transmission within the LBT-SB (or a value equivalent to the amount of frequency resources). Additionally, (for PAPR reduction), different base sequences (e.g., root indexes) and/or cyclic shifts used to generate DMRS sequences mapped to/transmitted in the plurality of LBT-SBs allocated for the single UL channel transmission may be set for the LBT-SBs.

Additionally, when one PUSCH transmission resource is allocated/scheduled across a plurality of LBT-SBs, an operation of transmitting UCI (e.g., an HARQ-ACK or a CSI report) on a corresponding PUSCH by piggyback may be required. In this case, Opt a) the UE may repeatedly map the UCI to all of the plurality of LBT-SBs allocated for the PUSCH transmission (e.g., repeatedly map the same (coded) UCI bit in each of the plurality of LBT-SBs), or Opt b) the UE may piggyback the UCI to the PUSCH by mapping the UCI only to a specific part of the plurality of LBT-SBs (e.g., a single LBT-SB). In Opt a/b (especially Opt b), a seed value for a scrambling sequence applied to the (coded) UCI bit piggybacked to the specific LBT-SB may be calculated (to be a different value) according to an LBT-SB index (or the index of a specific RB of the LBT-SB).

(5) Proposed Method 5

In the NR U-band situation, it may be configured that UL grant DCI transmitted in a specific CCE, CCE #1 indicates a PUSCH transmission in CCE #2 different from CCE #1. It may be configured that even in one CC/BWP, UL grant DCI transmitted in a specific LBT-SB, LBT-SB #1 indicates a PUSCH transmission in LBT-SB #2 different from LBT-SB #1. In this PUSCH scheduling situation, when a backoff-based LBT type (e.g., Cat-4 LBT) using a variable contention window size (CWS) is indicated for a PUSCH transmission, the BS may perform a short (25 usec) CCA gap-based LBT type (e.g., Cat-2 LBT) without backoff shortly after the ending time of the PUSCH transmission to transmit a DL channel/signal (e.g., PDCCH) in CCE #2 or LBT-SB #2 in which the PUSCH has been transmitted/received.

In the NR U-band situation, it may further be configured/indicated that an HARQ-ACK (PUCCH) signal corresponding to DL grant DCI and a PDSCH transmitted in CCE #1 is transmitted in CCE #2 different from CCE #1. It may be configured/indicated that even in one CC/BWP, an HARQ-ACK (PUCCH) signal corresponding to DL grant DCI and a PDSCH transmitted in a specific LBT-SB, LBT-SB #1 is transmitted in LBT-SB #2 different from LBT-SB #1. In this HARQ-ACK PUCCH transmission situation, when a backoff-based LBT type (e.g., Cat-4 LBT) using a variable CWS is indicated for the PUCCH transmission, the BS may perform a short (25 usec) CCA gap-based LBT type (e.g., Cat-2 LBT) without backoff shortly after the ending time of the PUCCH transmission to transmit a DL channel/signal (e.g., PDCCH) in CCE #2 or LBT-SB #2 in which the PUCCH has been transmitted/received.

Even in the case of a periodic UCI (e.g., SR or CSI) PUCCH transmission configured by a higher-layer signal (e.g., RRC signaling), when a backoff-based LBT type (e.g., Cat-4 LBT) through a variable CWS is configured for the periodic UCI PUCCH transmission, the BS may perform a short (25-usec) CCA gap-based LBT type without back-off (e.g., Cat-2 LBT) immediately after the ending time of the PUCCH transmission, to transmit a DL channel/signal (e.g., PDCCH) in an CC or LBT-SB in which the PUCCH has been transmitted/received.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 14:
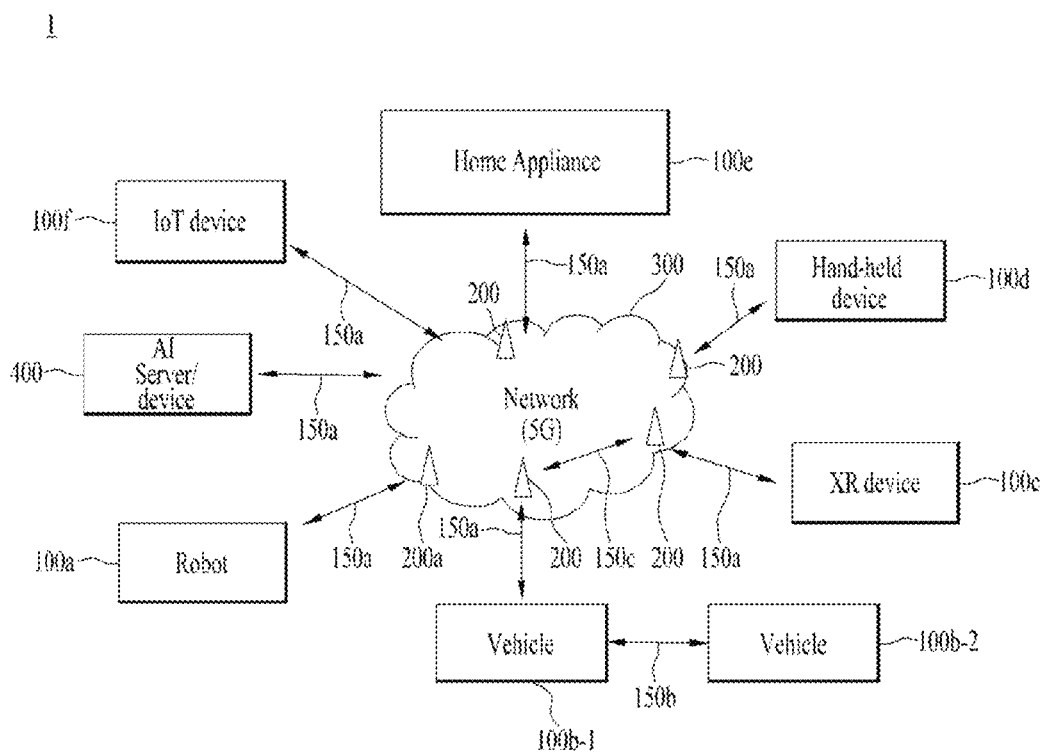
FIGS. 14 to 17 illustrate a communication system 1 and wireless devices applied to the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
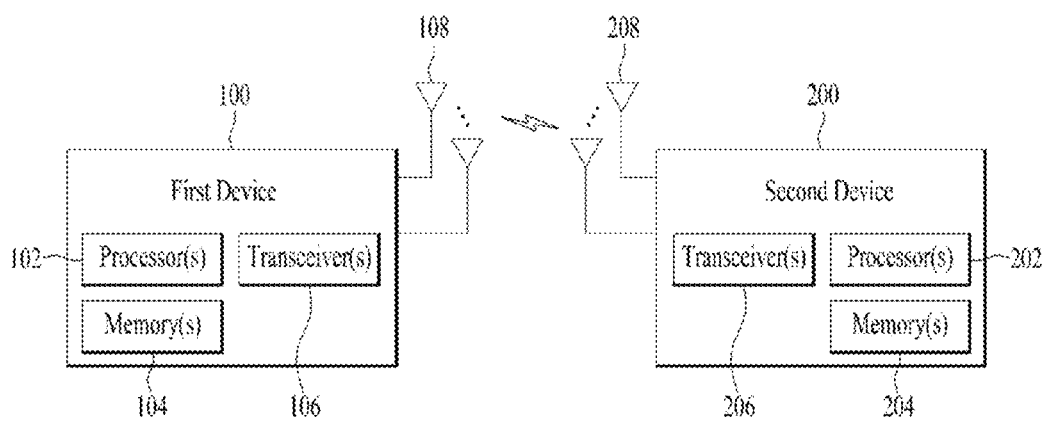

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
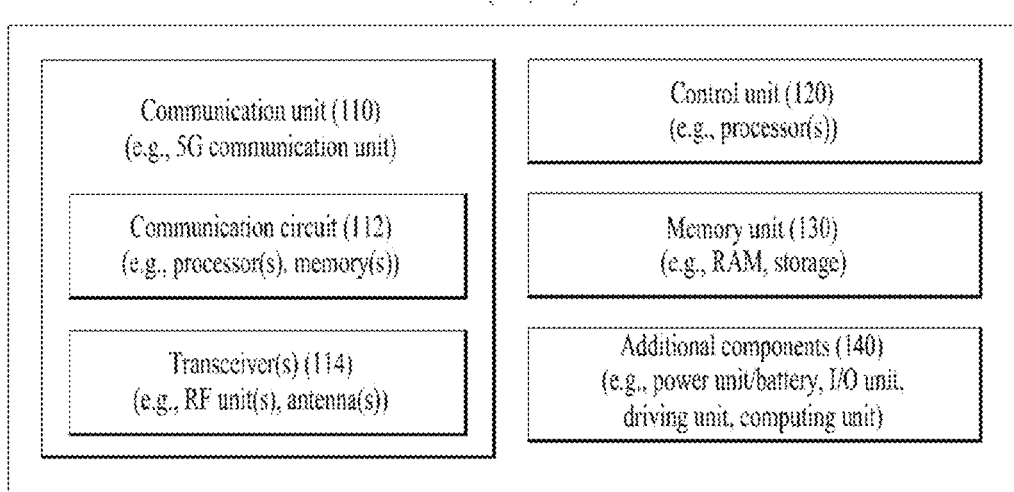

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
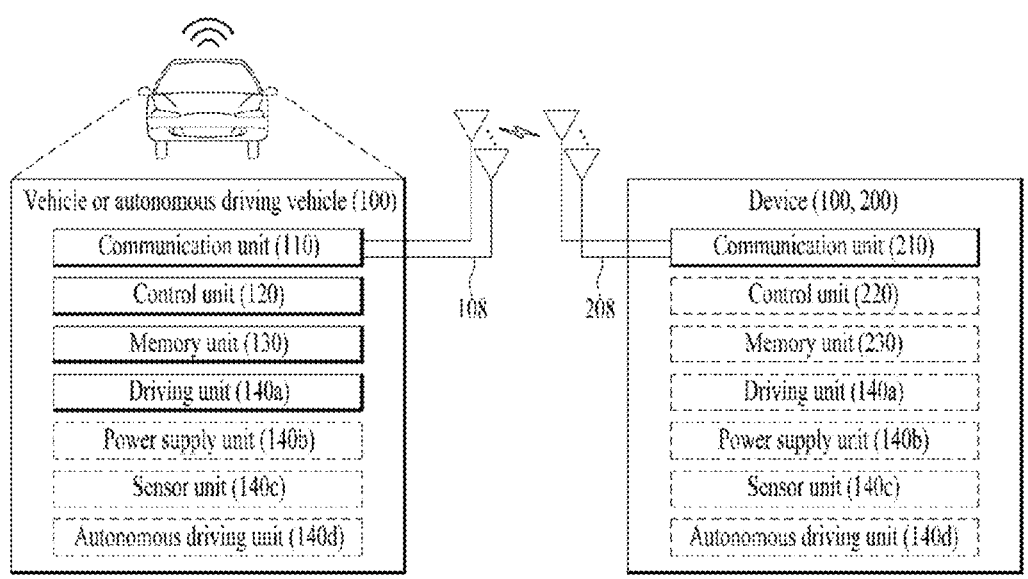

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

What is claimed is:

1. A method of receiving a signal by a user equipment (UE) in a wireless communication system, the method comprising:
   receiving a search-space set (SS) configuration and a control resource set (CORESET) configuration which are associated with each other; and
   receiving a physical downlink control channel (PDCCH) in a bandwidth part (BWP) including resource block (RB) sets, based on the SS configuration and the CORESET configuration,
   wherein a CORESET of at least one second RB set in the BWP is configured based on a CORESET frequency resource pattern of a first RB set in the BWP, and
   wherein the SS configuration includes first information regarding a number of PDCCH candidates to be monitored by the UE for each aggregation level, and second information regarding the at least one second RB set to which the CORESET frequency resource pattern of the first RB set is replicated.

2. The method of claim 1, wherein the number of the PDCCH candidates is the same for each of the at least one second RB set.

3. The method of claim 1, wherein the second information is configured as a bitmap, and each bit of the bitmap is associated with each RB set in the BWP.

4. The method of claim 1, wherein the SS configuration and the CORESET configuration are received through higher layer signaling.

5. The method of claim 1, wherein the BWP is included in a shared spectrum.

6. The method of claim 1, wherein a same SS is configured in the CORESET of each of at least one second RB set.

7. The method of claim 1, wherein the CORESET configuration includes information regarding the CORESET frequency resource pattern.

8. A non-transitory medium readable by a processor and recorded thereon instructions, when executed by the processor, that cause the processor to perform the method of claim 1.

9. A device for wireless communication, the device comprising:
- a memory configured to store instructions; and
- a processor configured to perform operations by executing the instructions, the operations comprising:
  - receiving a search-space set (SS) configuration and a control resource set (CORESET) configuration which are associated with each other; and
  - receiving a physical downlink control channel (PDCCH) in a bandwidth part (BWP) including resource block (RB) sets, based on the SS configuration and the CORESET configuration,
  - wherein a CORESET of at least one second RB set in the BWP is configured based on a CORESET frequency resource pattern of a first RB set in the BWP, and
  - wherein the SS configuration includes first information regarding a number of PDCCH candidates to be monitored by the device for each aggregation level, and second information regarding the at least one second RB set to which the CORESET frequency resource pattern of the first RB set is replicated.

10. The device of claim 9, further comprising:
- a transceiver configured to transmit or receive a wireless signal under control of the processor,
- wherein the device is a user equipment (UE).

11. The device of claim 9, wherein the device is a processing device configured to control a user equipment (UE).

12. A method of transmitting a signal by a base station (BS) in a wireless communication system, the method comprising:
- transmitting a search-space set (SS) configuration and a control resource set (CORESET) configuration which are associated with each other; and
- transmitting a physical downlink control channel (PDCCH) in a bandwidth part (BWP) including resource block (RB) sets, based on the SS configuration and the CORESET configuration,
- wherein a CORESET of at least one second RB set in the BWP is configured based on a CORESET frequency resource pattern of a first RB set in the BWP, and
- wherein the SS configuration includes first information regarding a number of PDCCH candidates for each aggregation level, and second information regarding the at least one second RB set to which the CORESET frequency resource pattern of the first RB set is replicated.

13. A non-transitory medium readable by a processor and recorded thereon instructions, when executed by the processor, that cause the processor to perform the method of claim 12.

14. A device for wireless communication, the device comprising:
- a memory configured to store instructions; and
- a processor configured to perform operations by executing the instructions, the operations comprising:
  - transmitting a search-space set (SS) configuration and a control resource set (CORESET) configuration which are associated with each other; and
  - transmitting a physical downlink control channel (PDCCH) in a bandwidth part (BWP) including resource block (RB) sets, based on the SS configuration and the CORESET configuration,
  - wherein a CORESET of at least one second RB set in the BWP is configured based on a CORESET frequency resource pattern of a first RB set in the BWP, and
  - wherein the SS configuration includes first information regarding a number of PDCCH candidates for each aggregation level, and second information regarding the at least one second RB set to which the CORESET frequency resource pattern of the first RB set is replicated.

15. The device of claim 14, further comprising:
a transceiver configured to transmit or receive a wireless signal under control of the processor,
wherein the device is a base station (BS).

* * * * *